July 13, 1954 G. C. ARNAL 2,683,378
PIVOTAL BEVEL GEARING
Filed May 2, 1949 2 Sheets-Sheet 1
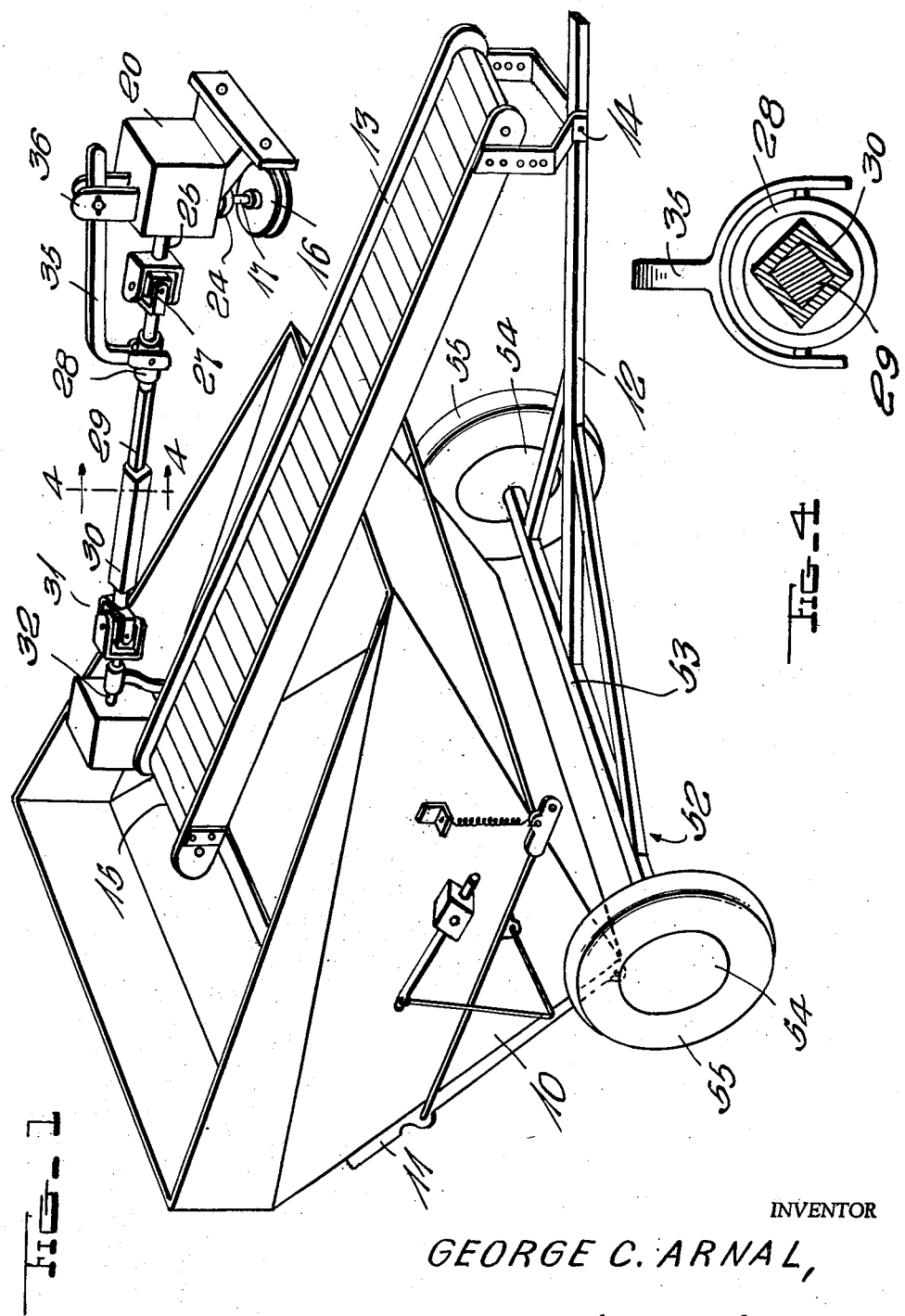
INVENTOR
GEORGE C. ARNAL,
BY John B. Brady
ATTORNEY July 13, 1954  G. C. ARNAL  2,683,378
PIVOTAL BEVEL GEARING
Filed May 2, 1949  2 Sheets-Sheet 2
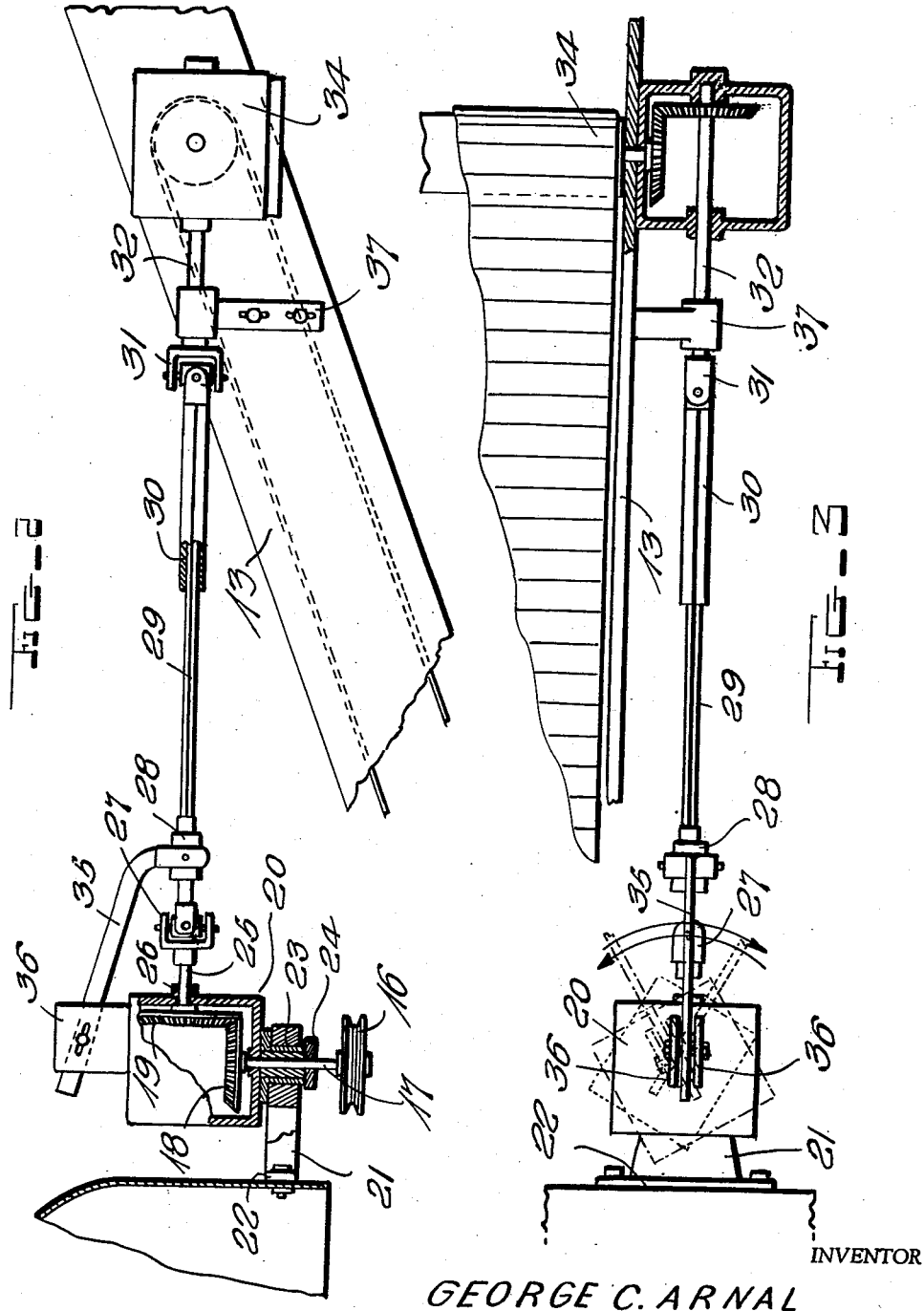
INVENTOR
GEORGE C. ARNAL,
BY
John B. Brady
ATTORNEY // Patented July 13, 1954

2,683,378

UNITED STATES PATENT OFFICE 2,683,378

PIVOTAL BEVEL GEARING

George C. Arnal, Ravenscrag, Saskatchewan, Canada

Application May 2, 1949, Serial No. 90,887

7 Claims. (Cl. 74—385)

This invention relates to a device capable of attachment to a power vehicle so as to permit complete freedom of movement between the two and at the same time to allow transmission of power from the vehicle to the device by means of a universal joint and bevel gear system, the power being used to drive a conveyer attached to the device and which is capable of transporting straw or other material from the vehicle to the device.

Although the language expressing the nature of the invention is phrased generally I may say that my work in developing the invention has been confined to the device known as a buncher used as an attachment to a combine to permit the saving and accumulation of straw as it is emitted from the combine.

The present practice of harvesting with a combine is to attach to the combine a straw spreader to spread the straw it receives from the combine more or less evenly over the freshly cut field of grain. As the stubble on the field is rarely cut close to the ground, the straw is not easily recoverable. Lately, due to shortage of feed, attempts have been made to recover the straw as it leaves the combine although these attempts have not been entirely successful as they tend to decrease the efficiency of the combine.

Attempts heretofore of collecting straw in bunches involved the necessity of additional work on the part of the combine operator in that he was required to operate the conveyer and to open or close the dumping member on the buncher and otherwise attend to its operation as well as that of the combine. Other attempts included the use of separate power devices to operate the conveyer and the opening and closing of the dump member.

To provide a continuous supply of straw I attach to my buncher the normal type of conveyer belt which is powered through the attachment described below from the combine proper, the source of power being identical with that used to power a straw-spreader. The attachment is so designed that, regardless of the land surface over which the combine and buncher passes or the angles through which the combine may turn, the buncher is free to follow without interruption to the continuous ability of the conveyer to pass straw into the buncher. The conveyer, of course, is so attached to the buncher that it may be raised, lowered or otherwise adjusted to fit any type of combine or vehicle.

In the drawings which illustrate embodiments of the invention,

Figure 1 is a general perspective drawing of the buncher proper showing its attached conveyer but not depicting the attachment to the combine whereby the conveyer is powered;

Fig. 2 is a fragmentary side elevational view of the transmission mechanism of my invention partially broken away and illustrated in section and showing the parts in detail;

Fig. 3 is a fragmentary top plan view of the transmission mechanism shown in Fig. 2 with parts broken away and illustrated in section; and Fig. 4 is a vertical sectional view through the transmission shaft on line 4—4 of Fig. 1.

The device or buncher illustrated comprises a self-contained vehicle 10 with an automatic dumping member 11 to which vehicle is attached a hitch and tongue 12 adjustable in length, and any normal type conveyer system 13 so adapted at its junction with the hitch and tongue at 14 and at the vehicle proper at 15 as to be adjustable either horizontally or vertically. Motive power for the conveyer 13 originates in the combine, its V-belt drives a V-pulley 16 which in turn drives through a bevel gear shaft 17, a set of bevel gears 18 and 19 in a gear box 20 resting upon a large support casting 21 attached to the combine at 22. The gear box casting is sufficiently large to allow full clearance for the gear box as it swivels on the support casting permitting turning angles not less than 100 degrees on either side of center to be made. The gear box is fitted with a sleeve 23 and a lock ring 24 which prevents slipping of the gear box and its removal from the support casting. The bevel gears 18 and 19 are fitted at a ratio of 1½ to 1, the gears being keyed together to allow bearings to take up the end thrust. The bevel pinion gear 19 surrounds a pinion shaft 25 and is fitted with bearings at 26 to take up the aforementioned end thrust where the pinion shaft meets the gear box. The pinion shaft outside the gear box is connected with a universal joint 27, in turn connected with an alignment control bearing 28 of a roller type, in turn connected to a square shaft 29 fitting within a pipe 30 as shown in Fig. 4 snugly but sufficiently loose to permit sliding and which latter is in turn connected to a universal joint 31. Connected to the universal joint by a bevel gear shaft 32 and in the same fashion as described above is a set of bevel gears and gear box which operates the upper roller of the conveyer 34. The gear box bearings and pinion shaft are the same as already described.

For best operation the bevel gear shaft in the gear box at upper roller of elevator should form approximately a 75 degree angle with the roller. Gear ratio should be 1 to 1.

To promote strength of connection between the gear box on the combine and the gear box at the upper roller of the elevator without interfering with necessary flexibility, an alignment control arm 35 is bolted between two welded plates 36 on the top of the gear box on the combine and is joined to a bearing 28 on the drive shaft 29 on the opposite side of the universal joint 27. To permit movement the bolts at each end of the alignment control bearing may be allowed to slip in holes of greater diameter than the diameter of the bolts. A drive support bracket 37 adjustable in the same manner as the alignment control arm is fixed between the upper section of the elevator and the drive shaft, joining the latter by a bearing.

It is, of course, apparent that V-pulleys on the gear box on the combine may be made adjustable by way of shims to increase or decrease the speed of various combines.

In order to support the buncher 10 and give mobility an undercarriage shown generally at 52 is provided. The undercarriage 52 consists of a transverse axle 53 and wheels 54. The wheels 54 may be equipped with pneumatic tires 55 to enable the apparatus to be used at the high speeds of modern agricultural equipment. The hitch and tongue 12 is connected to the axle 53.

The conveyer drive shaft provides for freedom of movement of the buncher as it follows behind the combine. This freedom of movement enables the combine operator to negotiate portions of a field that would not normally be possible.

I claim:

1. Transmission mechanism comprising a frame, a horizontally extending supporting member projecting from said frame, a gear box journaled in the extremity of said supporting member and angularly adjustable about a vertical axis so spaced from said frame that said gear box may shift in position on either side of the center through not less than 100°, a pair of bevel gears in said gear box, means for compensating for end thrust on one of said gears, means for journaling the other of said gears in the side of said gear box, a pinion shaft connected with said last mentioned gear, a universal joint connected with said pinion shaft, a power transmission shaft connected with said universal joint, an alignment control arm forming a journaled support for said power transmission shaft, and means mounted on the top of said gear box for supporting said alignment control arm.

2. Transmission mechanism as set forth in claim 1 in which said last mentioned means comprises a pair of vertically extending parallel plate members between which said alignment control arm is secured.

3. Transmission mechanism as set forth in claim 1 in which the means mounted on the top of said gear box for supporting said alignment control arm comprises vertically erect means and a connection extending through said vertically erect means in a position substantially above the top of said gear box for fastening said control arm.

4. Transmission mechanism as set forth in claim 1 in which said alignment control arm extends at an acute angle with respect to the axis of said power transmission shaft from the means mounted on top of said gear box for supporting said alignment control arm to the journaled support for said power transmission shaft and wherein said universal joint is disposed between said pinion shaft and the journaled support for said power transmission shaft in said alignment control arm.

5. Transmission mechanism as set forth in claim 1 in which said alignment control arm has a linear portion and a downwardly curved portion and wherein the linear portion conects with the means mounted on top of said gear box and said curved portion serves as a mounting means for the journaled support for said power transmission shaft.

6. Transmission mechanism as set forth in claim 1 in which said horizontally extending supporting member supports a vertically disposed sleeve member having a laterally extending flange thereon and wherein said flange serves as a support for said gear box as the gear box orients in position with respect to frame.

7. Transmission mechanism as set forth in claim 1 in which said gear box is a walled structure enclosing said bevel gears, said walled structure being polygonal in shape and wherein the means mounted on the top of said gear box for supporting said alignment control arm is disposed at one side of the top of said gear box displaced from the vertical axis about which said gear box is angularly adjustable.

References Cited in the file of this patent

UNITED STATES PATENTS

| Number | Name | Date |
| --- | --- | --- |
| 948,006 | Cocking | Feb. 1, 1910 |
| 2,219,533 | Ross | Oct. 29, 1940 |
| 2,305,495 | Rehn | Dec. 15, 1942 |
| 2,316,435 | James | Apr. 13, 1943 |
| 2,383,412 | Orendorff | Aug. 21, 1945 |
| 2,389,567 | Thornton | Nov. 20, 1945 |
| 2,482,160 | Donough | Sept. 20, 1949 |
| 2,482,413 | Gibson | Sept. 20, 1949 |
| 2,500,441 | Schurr et al. | Mar. 14, 1950 |
| 2,531,560 | De Wall | Nov. 28, 1950 |